A. MASS.
LIQUID METER.
APPLICATION FILED JAN. 15, 1915.
1,165,429.
Patented Dec. 28, 1915.
2 SHEETS—SHEET 1.
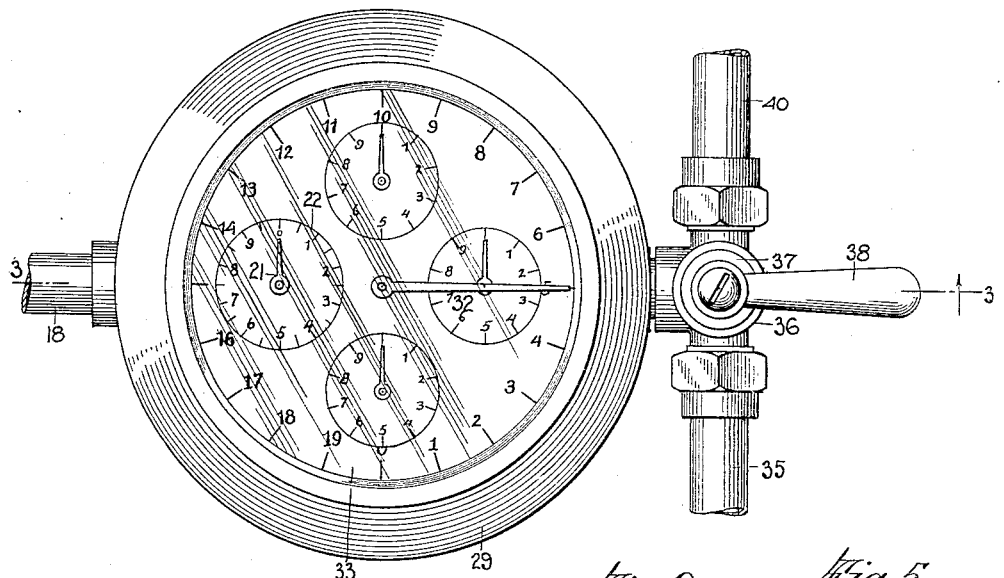
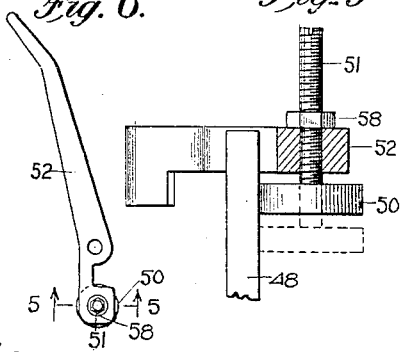
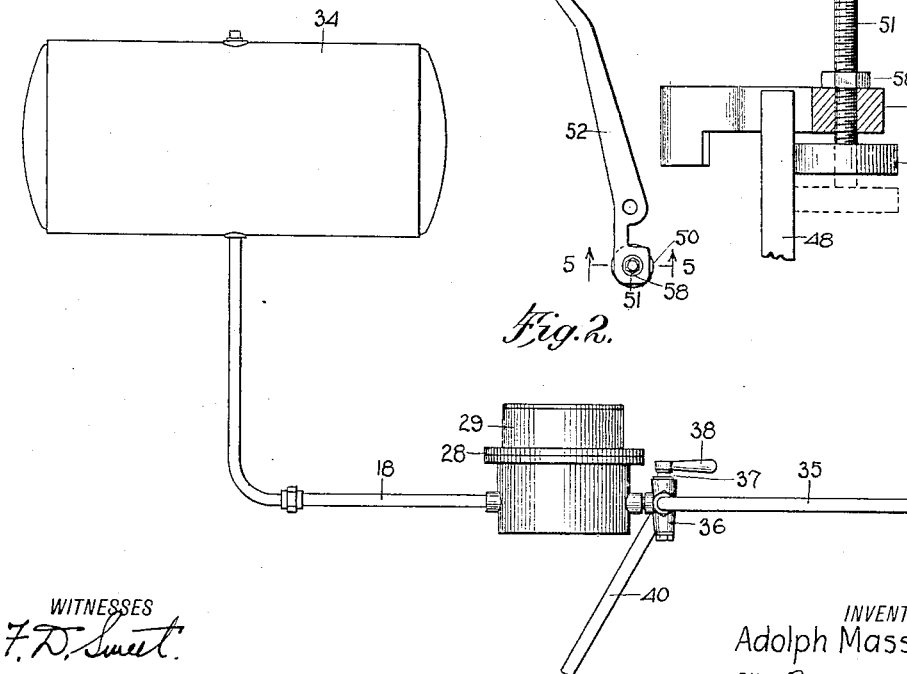
WITNESSES
INVENTOR
Adolph Mass
BY
ATTORNEYS

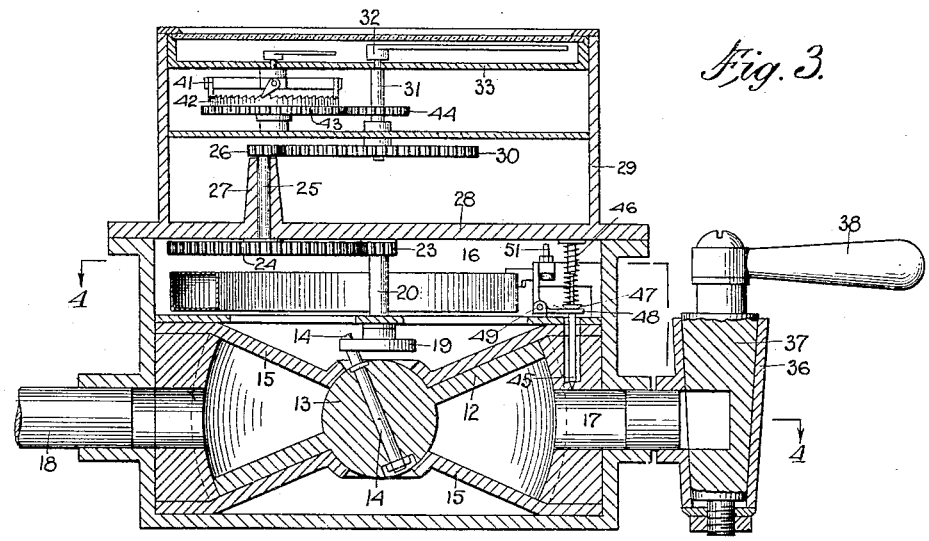
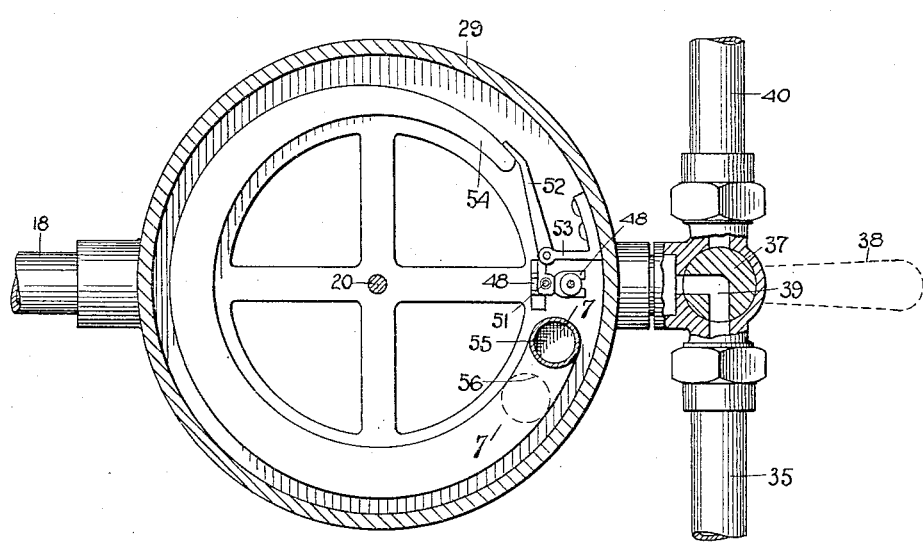
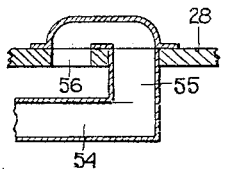

UNITED STATES PATENT OFFICE.

ADOLPH MASS, OF NEWARK, NEW JERSEY.

LIQUID-METER.

1,165,429.  Specification of Letters Patent.  Patented Dec. 28, 1915.

Application filed January 15, 1915. Serial No. 2,357.

*To all whom it may concern:*

Be it known that I, ADOLPH MASS, a subject of the German Emperor, and a resident of Newark, in the county of Essex and State of New Jersey, have invented a new and Improved Liquid-Meter, of which the following is a full, clear, and exact description.

Among the principal objects which the present invention has in view are: to provide an apparatus of the character mentioned with means for showing the amount received and the amount delivered through said apparatus; to counterbalance unpremeditated pressures exerted by the fluid when being passed through the meter; and to furnish an index for informing as to the condition of the supply of liquid on hand and the total consumption of liquid passed through the meter during an extended period.

*Drawings.*—Figure 1 is a top plan view of a meter constructed and arranged in accordance with the present invention; Fig. 2 is a side elevation on a diminished scale of said meter, showing in conjunction therewith a reservoir and supply and delivery pipes connected therewith; Fig. 3 is a vertical section taken on the line 3—3 in Fig. 1; Fig. 4 is a horizontal section taken on the line 4—4 in Fig. 3; Fig. 5 is a detail view in section, on an enlarged scale, of the adjustment provided for the counterbalancing delivery valve, the section being taken as on the line 5—5 in Fig. 6; Fig. 6 is a detail view in plan of the pressure lever for regulating the counterbalancing valve; Fig. 7 is a vertical section taken on the line 7—7 in Fig. 4.

*Description.*—The mechanism operated by the flow of liquid embodied in the present invention is that known as the Thomson disk meter, wherein a centrally-poised rocking disk 12 is provided with a pivot globe 13 and a connecting pin 14 extending therethrough. The globe 13 is mounted in bearings suitably formed in upper and lower partition plates 15. The disk 12 is rocked as the liquid flows from the chamber 16 above the top plate 15 to the normal delivery port 17 of the meter. The liquid is normally supplied to the chamber 16 through a pipe 18.

As in the conventional meters, the pin 14 is loosely mounted in an edge opening slot provided in a connecting disk 19 rigidly mounted at the lower end of the driving shaft 20. The driving shaft 20 is usually employed to operate a train of gears connected with and forming the motive power for the pointers 21 of coördinated dials 22.

In the present invention the usual train of gears is replaced by a small pinion 23, which is meshed with a large gear wheel 24, both within the chamber 16. The wheel 24 is suspended from the lower end of a shaft 25, which is furnished at the upper end thereof with a small pinion 26. To support the shaft 25 a boss 27 is formed on the base 28 of the meter case 29. The pinion 26 is meshed with a large gear wheel 30 mounted on the vertical shaft 31, at the upper and exposed end whereof is fixedly attached a pointer 32 above a dial plate 33. The dial plate 33 is graduated to indicate a number of gallons or other units of measure. The pointer 32 indicates, by means of the markings on said dial plate, the amount of oil or other liquid at any time remaining in the tank 34.

During the delivery from the tank 34 the pointer 32 rotates clockwise and counter to the graduations on said dial plate. In this manner the dial shows a progressively diminishing quantity of liquid, as indicated by the meter and pointer 32 thereof as the liquid is withdrawn from the tank 34. Thus, at a glance the user can tell the quantity of liquid contained in the tank 34 against which he can draw. When the liquid in the tank 34 is replenished it is delivered thereto through the supply pipe 35 or faucet 36 and the port 17. The port 17 is controlled by a two-way valve 37, which may be turned by the handle 38 so that the passage 39 in the plug of the valve is made to register at will with the supply pipe 35 or the delivery pipe 40, as seen best in Fig. 4 of the drawings. When the liquid flows through the meter from the supply pipe 35 to the pipe 18 and tank 34 connected therewith, the meter is rotated in a reverse direction to that induced by the flow of liquid in the opposite direction, and the pointer 32 is moved backward over the graduations or markings indicating the same until the full capacity of the tank 34 is indicated.

When using the meter in the above manner, it is obvious that an attendant may at all times tell with accuracy the amount of liquid which is being delivered to the tank 34. When the installation is on an automobile and the tank 34 represents the tank for gasolene, the driver can at all times when being supplied through the pipe 35, by a public purveyor, tell accurately the amount of gasolene which is being delivered to him. Also it is obvious that when subsequently the gasolene is withdrawn from the tank 34 by the consumption of the engine, the condition of, or reserve amount of gasolene retained in, said tank is always in evidence before the driver.

The pointers 21 of the dials 22 are driven each by the other progressively and in the manner usually employed in calculating machinery. The initial pointer and the gear wheel connected therewith are driven by means of a series of pawls 41, which engage the crown ratchet-toothed ring 42 when said ring is moved in one direction, and are unaffected by said ring when moved in the opposite direction. The ring 42 is mounted upon a large gear wheel 43, with the gear teeth of which are meshed the teeth of a pinion 44 on the shaft 31. The pinion 44, the wheel 43, and the ring 42 are constantly moved in correspondence with the operation of the shaft 31 and the pointer 32 thereon. The shaft on which the initial pointer 21 is mounted is revolved, however, only when the shaft 31 and pointer 32 are rotated in a manner to cause the ring 42 to engage the pawls 41. This time corresponds with the delivery of the liquid from the tank 34, during which, it will be remembered, the pointer 32 moves from the higher to the lower numbers marked upon the dial plate 33. When, however, the tank 34 is replenished and the train of gear wheels is driven to carry the pointer 32 backward, the pointers 21 and connecting gear train are unaffected by the operation. Thus it will be seen that the pointer 32 is manipulated to at all times indicate the quantity of liquid contained in the tank 34, while the reading of the coördinated dials 22 and pointers 21 thereon represents the total amount of liquid which has been dispensed from said tank 34.

To counterbalance the sudden and unpremeditated pressures of liquid delivered by the supply pipe 35, I have provided a needle valve 45. The valve 45 normally closes an opening from the port 17 to a passage communicating with the chamber 16. The valve 45 is normally seated by a spring 46 and a head 47 on said valve. A bell crank lever 48 is normally pivoted by a pin 49, as shown best in Fig. 3 of the drawings. The foot of the lever 48 is bifurcatetd to extend beneath the head 47 of the valve 45. The free end of the lever 48 is vertically extended to engage a head 50 on an adjusting screw 51 which engages the end of a lever 52.

The lever 52 is pivoted at the end of a bracket 53, as seen best in Fig. 4 of the drawings. The free end of the lever 52 rests against the flexible end of a Bourdon tube 54. The opposite end of the tube 54 is fixed and has a vertical passage 55, which extends upward through the base 28 of the case 29. Adjacent the opening made in the base 28 to register with the passage 55 is a second opening 56. The two openings are joined by a cover 57, which forms a transverse passage affording admission for the liquid contained in the chamber 16, to the Bourdon tube 54. The operation of the Bourdon tube in the present instance is conventional to tubes of this character. That is, as the pressure in the tube varies so the curve of said tube varies. That is to say, as the pressure increases in the tube, the convolution of the tube is expanded, the flexible end of said tube moving outward from the center if the opposite end is held firmly. When thus affected, the flexible end of the tube 54 presses outward the free end of the lever 52, which lever, being pivoted, forces the head 50 of the screw 51 against the side of the lever 48. The lever 48 being thus rocked, the valve 45 is lifted, and liquid is permitted to pass directly from the port 17 to the chamber 16 to equalize the pressure in said chamber. The back pressure thus increased in the chamber 16 overcomes the tendency to race the disk 12 consequent upon the sudden increase or jump of the pressure of the liquid when delivering the same to the tank 34. In this manner there is avoided false registration of the amount of liquid supplied to the tank 34.

By adjusting the screw 51 and locking the same by means of a nut 58, the point of bearing of the head 50 on the standing arm of the lever 48 may be moved to and from the fulcrum of said lever to thereby vary the extent of operation of said lever. By means of this adjustment, it is obvious, the meter may be set to correct any inaccuracies or misregistration known to exist therein.

Claims:

1. A meter as characterized, comprising a reversible registering mechanism embodying a graduated dial plate and a pointer rotatably mounted thereon; a casing for said mechanism embodying inlet and outlet ports disposed at opposite sides of said mechanism, said ports being adapted for use alternately as receiving and delivering members; and a total-registering mechanism operatively connected with said reversible registering mechanism when said reversible registering mechanism is moved in one direction only.

2. In combination with a holding tank, a meter as characterized, comprising a continuously-acting, reversible, registering mechanism for visibly registering progressively and retrogressively the contents of said tank; and a total-registering mechanism operable by said reversible registering mechanism for indicating accumulatively the amount of deliveries from said tank.

3. In combination with a holding tank, a meter as characterized, comprising a continuously - acting, reversible, registering mechanism for visibly registering progressively and retrogressively the contents of said tank; a total-registering mechanism operable by said reversible registering mechanism for indicating accumulatively the amount of deliveries from said tank; and means disposed at the side of said reversible mechanism opposite said tank for transferring the pressure of the supply of liquid to said tank to the side of said reversible mechanism adjacent said tank.

4. In combination with a holding tank, a meter as characterized, comprising a continuously - acting, reversible, registering mechanism for visibly registering progressively and retrogressively the contents of said tank; a total-registering mechanism operable by said reversible registering mechanism for indicating accumulatively the amount of deliveries from said tank; a by-pass for transferring liquid from the delivery side to the receiving side of said reversible mechanism; and a pressure-controlled valve for said by-pass.

5. In combination with a holding tank, a meter as characterized, comprising a continuously - acting, reversible, registering mechanism for visibly registering progressively and retrogressively the contents of said tank; a total-registering mechanism operable by said reversible registering mechanism for indicating accumulatively the amount of deliveries from said tank; a by-pass for transferring liquid from the delivery side to the receiving side of said reversible mechanism adjacent said tank; a pressure-controlled valve for said by-pass; and means operable by the pressure at the far side of said reversible mechanism for varying the operation of said valve.

6. In combination with a holding tank, a meter as characterized, comprising a continuously - acting, reversible, registering mechanism for visibly registering progressively and retrogressively the contents of said tank; a total-registering mechanism operable by said reversible registering mechanism for indicating accumulatively the amount of deliveries from said tank; a by-pass for transferring liquid from the delivery side to the receiving side of said reversible mechanism; a pressure-controlled valve for said by-pass; an expansible tube in open communication with the liquid at the side of said mechanism adjacent said tank; and a lever operatively connecting said tube and said valve to lift said valve in correspondence with the pressure of the liquid in which said tube is disposed.

7. In combination with a holding tank, a meter as characterized, comprising a continuously - acting, reversible, registering mechanism for visibly registering progressively and retrogressively the contents of said tank; a total-registering mechanism operable by said reversible registering mechanism for indicating accumulatively the amount of deliveries from said tank; a by-pass for transferring liquid from the delivery side to the receiving side of said reversible mechanism; a pressure-controlled valve for said by-pass; an expansible tube in open communication with the liquid at the side of said mechanism adjacent said tank; a lever operatively connecting said tube and said valve to lift said valve in correspondence with the pressure of the liquid in which said tube is disposed; and manually-operable means for varying the movement of engagement of said tube and said lever.

In testimony whereof I have signed my name to this specification in the presence of two subscribing witnesses.

ADOLPH MASS.

Witnesses:
E. F. MURDOCK,
PHILIP D. ROLLHAUS.

Copies of this patent may be obtained for five cents each, by addressing the "Commissioner of Patents, Washington, D. C."